United States Patent Office 3,082,191
Patented Mar. 19, 1963

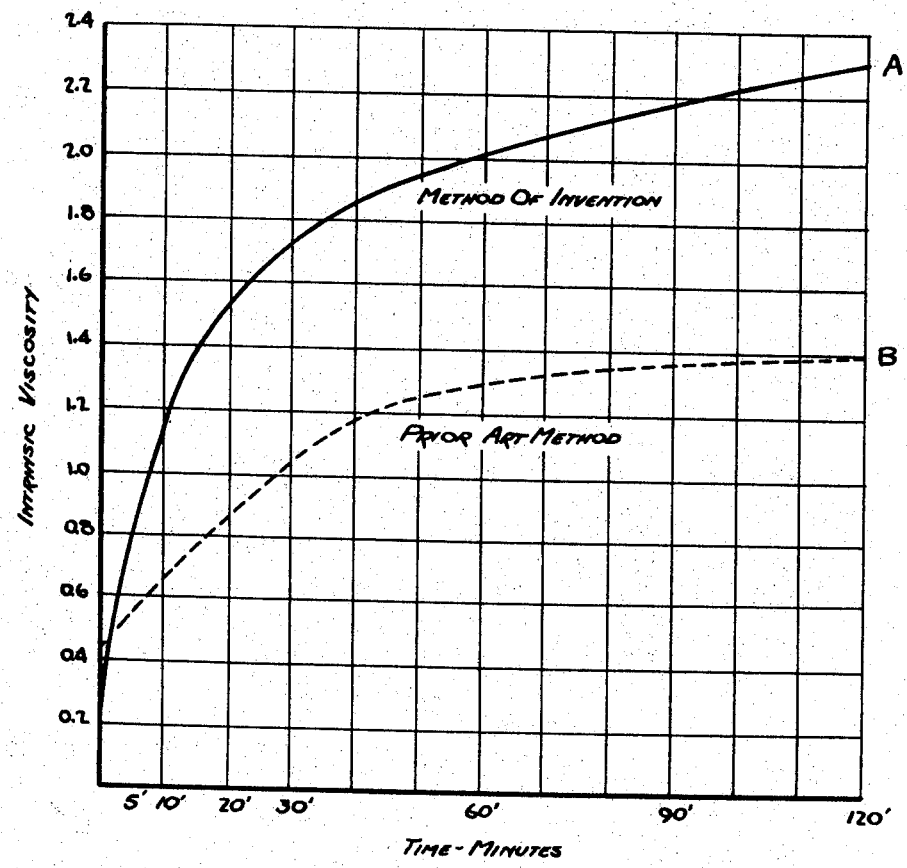

3,082,191
PROCESS OF PREPARING POLYAMIDES FROM MIXED ANHYDRIDES AND DIAMINES
Thomas B. Windholz, Westfield, N.J., assignor to Celanese Corporation of America, New York, N.Y., a corporation of Delaware
Filed Mar. 17, 1958, Ser. No. 721,861
6 Claims. (Cl. 260—78)

This invention relates to a novel method of preparing polyamides, to novel polyamides of exceptionally high molecular weight, to novel compounds which are useful intermediates in the preparation of polyamides and to a novel method for preparing such compounds.

Polyamides having a general formula with a recurring structure

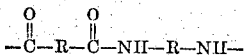

wherein each R represents a divalent radical, are known to be useful in the preparation of textile fibers, monofilaments and molded articles. They are generally prepared by the condensation of a dicarboxylic acid of the formula

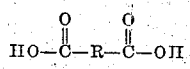

and a di-primary amine of the formula $$H_2N-R-NH_2$$

wherein each R is a divalent radical.

Preparation of polyamides by condensation reactions requires elevated temperatures, of the order of 200° C., for extended periods of time, of the order of 2 to 4 hours. Such extended heating is conducive to the formation of colored by-products. The reaction is particularly sensitive to variations in process conditions so that small deviations result in substantially inferior products.

It is an object of this invention to provide a method for producing linear polyamides which does not require extended exposure to elevated temperatures and which produces polyamides in excellent yield without the formation of colored by-products.

It is a further object of this invention to provide novel compounds which are useful as intermediates in the preparation of polyamides and in the preparation of other materials and to provide a novel method for preparing such compounds.

These and other objects are accomplished by preparing a mixed anhydride of (a) a dicarboxylic acid and (b) a monoester of carbonic acid. The mixed anhydride reacts readily with primary amines to produce useful amides.

The anhydride reacts with monoprimary amines to produce diamides and with di-primary amines to produce polyamides.

The preferred polyamide-forming anhydrides may be represented by the formula

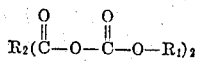

wherein $R_1$ is a monovalent ester-forming hydrogen substituent radical, $R_2$ is a divalent radical free of ethylenic unsaturation. $R_1$ may, for example, be an alkyl, aryl or aralkyl radical while $R_2$ may be an alkylene, arylene or aralkylene radical.

The mixed di-anhydride is prepared by the reaction of a dicarboxylic acid or a metal or ammonium salt of a dicarboxylic acid with an ester of chloroformic acid under conditions conducive to the removal of the hydrogen chloride formed, or of the metal or ammonium chloride formed.

The reaction with the dicarboxylic acid follows the following equation

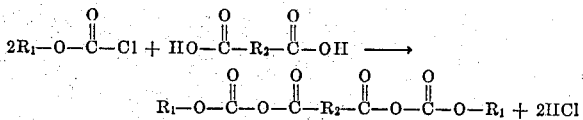

wherein $R_1$ and $R_2$ are defined as above.

Among the most useful of the mixed di-anhydrides are those wherein $R_1$ is alkyl and $R_2$ is alkylene. These anhydrides may be represented by the formula

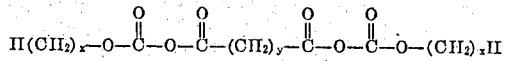

wherein $x$ is an integer from 1 to 5 and $y$ is an integer from 1 to 11.

In a preferred method of preparation, the dicarboxylic acid and a hydrogen chloride acceptor, such as a tertiary amine are dissolved in an organic solvent at room temperature and then cooled to a temperature of the order of $-5°$ C. The alkyl chloroformate is then added with stirring until a crystalline precipitate of the amine hydrochloride is formed. The reaction product is filtered and the filtered solution contains the mixed anhydride.

The dicarboxylic acid selected depends on the nature of the polyamide desired. For polyadipamides, adipic acid is used. Other dicarboxylic acids which may be used are terephthalic acid, sebacic acid and suberic acid. If desired, ammonium salts or metallic salts, such as sodium or potassium salts of dicarboxylic acids may be used.

Among the suitable organic solvents for the preparation of the mixed anhydrides are tetrahydrofuran, cyclohexane, benzene, toluene, and chloroform. The minimum amount of solvent which may be used depends on the solubility of the reactants therein. Generally, from 5 to 20 parts by weight of solvent per part of dicarboxylic acid are used.

The preferred hydrogen chloride acceptor used with the dicarboxylic acid is a tertiary aliphatic or aromatic amine. Such amines do not react with the mixed anhydride product to form diamides. Among the specific tertiary amines which may be used are triethylamine, tributyl amine, dimethyl aniline and N-ethyl piperidine.

The hydrogen chloride acceptor is used in approximately stoichiometric quantities, or in slight excess, generally from about one to about 1.20 equivalents of hydrogen chloride acceptor per equivalent of alkyl chloroformate.

When a metal or ammonium salt of a dicarboxylic acid is used, the metal or ammonium chloride formed is taken out of the reaction by its insolubility in the organic solvent and it is not necessary to use a hydrogen chloride acceptor.

If desired, the hydrogen chloride acceptor may be eliminated even when the dicarboxylic acid is used as the reactant if the reaction is carried out under sufficiently low hydrogen chloride partial pressure so that the hydrogen chloride volatilizes as it is formed.

The preferred alkyl chloroformate is ethyl chloroformate. Since the alkyl radical of the chloroformate does not form a portion of the polyamide, any convenient alkyl chloroformate may be used, regardless of the nature of the polyamide desired. Other alkyl chloroformates such as methyl, propyl and butyl chloroformates may also be used. In addition to alkyl chloroformates, other esters of chloroformic acid may be used including aryl esters, aralkyl esters, alkaryl esters and substituted alkyl and aryl esters. Among the specific esters which may be used are phenyl chloroformate and benzyl chloroformate.

The chloroformate ester is used in approximately stoichiometric quantities, generally between about one and about 1.1 equivalents of the chloroformate ester per equivalent of dicarboxylic acid.

The reaction is generally carried out at atmospheric pressure and at temperatures from about 0° C. to about —60° C. The period of reaction may vary from about 10 minutes to about 2 hours.

In the preferred embodiment the di-anhydride reaction mixture is filtered to remove the tertiary amine hydrochloride and thereafter the desired diamine, in an organic solvent, is added to the clear filtered solution at a temperature of about —5° C. A precipitate forms immediately with subsequent evolution of carbon dioxide. Heat is slowly applied until the reflux temperature (generally between about 50° and about 80° C.) is attained and kept at reflux temperature for about one hour. The precipitate, recovered in almost quantitive yield, has an X-ray pattern identical with that of known polyamides derived from the same dicarboxylic acid and the same diamine. The precipitate, which may be called a prepolymer may be converted to a high molecular weight fiber-forming polyamide by heating at a temperature from about 180 to about 320° C. in about 5 to 45 minutes.

The reaction of the mixed di-anhydride and the diamine follows the following equation:

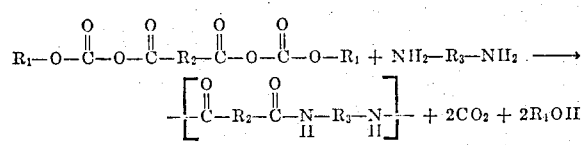

wherein $R_1$ and $R_2$ are as defined above, and $R_3$ is a divalent hydrocarbon radical free of ethylenic unsaturation.

Among the specific diamines which may be used are tetramethylene diamine, hexamethylene diamine, m-xylylene diamine, p-xylylene diamine and pentamethylene diamine.

The reaction of the mixed anhydride with the diamine is preferably started at a low temperature from about —40° C. to about —5° C. and permitted to rise over a period from about 10 to about 60 minutes to a temperature from about —15° to about +25° C. and finally heated to between about 50° and 80° C. for a period between about 30 and about 120 minutes. If desired, the reaction may be carried out at a fairly constant temperature or at a fluctuating temperature between the limits of about —5° to about +80° C.

The diamine solvent may be identical with the solvent in which the mixed anhydride was formed, or it may be a different solvent either miscible or immiscible with the anhydride solvent. In the latter case the reaction takes place in a heterogeneous medium. The diamine may be added in water solution, if desired, preferably in the presence of a small amount of detergent, or it may be added without a solvent.

The tertiary amine hydrochloride which is a by-product of the mixed anhydride formation step need not be separated from the solution prior to reaction with the diamine. It may be eliminated after the formation of the prepolymer by washing or boiling the new prepolymer with water.

After the prepolymer is heated as described above, it becomes a high molecular weight material which is useful for any of the products for which conventionally made polyamides are used, including fibers, monofilaments and molded products. In fact, as shown in the FIGURE, discussed herebelow, it is not only possible to obtain polymers of a given high molecular weight in a much shorter heating period by the method of this invention but it is also possible to obtain polymers of higher molecular weight than those heretofore obtained. For example, polytetramethylene adipamide has a maximum molecular weight, when obtained by the reaction of tetramethylene diamine with adipic acid, corresponding to an inherent viscosity of about 1.3 (measured in a 0.01% by weight solution in m-cresol at 25° C.). On the other hand polytetramethylene adipamide obtained by the method of this invention may have a molecular weight corresponding to an inherent viscosity of 2 or higher, when similarly measured.

*Example I*

To 0.73 part of adipic acid dissolved in about 20 parts of tetrahydrofuran, 1.40 parts triethylamine were added at room temperature. After cooling to —5° C., 1.08 parts of ethyl chloroformate were added with stirring. A crystalline precipitate was formed and filtered after 25 minutes, stirring at —5° C. It was triethylamine hydrochloride, formed in almost quantitative yield. The cooled filtered solution contained the mixed anhydride of adipic acid and ethyl carbonate, having the formula

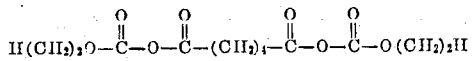

This product was characterized by treating its solution at —5° C. with the calculated amount of aniline; after stirring for 1 hour at room temperature and 1 hour at 45° C., the evolution of $CO_2$ stopped and the formed precipitate was filtered and after drying identified as N,N'-diphenyl adipamide; M.P. 239–240° C., formed in good yield.

*Example II*

The same mixed anhydride was prepared as in Example I and to its cooled, stirred solution was added at —5° C. a solution of 0.58 g. hexamethylene diamine in 25 parts of tetrahydrofuran. A precipitate formed immediately with subsequent evolution of $CO_2$. Heat was slowly applied until the reflux temperature was attained (about 70° C.) and the reactants were kept at this temperature for one hour. After cooling the white precipitate was filtered and dried. The yield was almost quantitative. The melting point was 250 to 256° C. The X-ray pattern of this product was identical with that of polyhexamethylene adipamide. After boiling in water for five minutes, followed by hot filtration and drying, the product had a melting point of 260° C. and an inherent viscosity of 0.18 (measured as above).

*Example III*

Using the same procedure as in Example II but adding instead of the hexamethylene diamine, the calculated amount of tetramethylenediamine the obtained product has a melting point of 300–303° C. and an inherent viscosity of 0.24 (measured as above).

*Example IV*

2.49 parts of terephthalic acid was suspended in 50 parts of chloroform, 4.20 parts of triethylamine was added and after slow heating (15 minutes at 40° C.) a small amount of an insoluble material was filtered off. To the clear solution, 2.88 parts of ethylchloroformate was added at —10° C. No precipitate formed due to the solubility of triethylamine hydrochloride in chloroform. The mixed anhydride of terephthalic acid and ethyl carbonate having the formula

was characterized by reaction with aniline as in Example I. The product obtained was terephthalic acid dianilid having a melting point of 330° C. (literature—334° C.).

After stirring for 20 minutes at the same temperature, 2.04 parts of meta-xylylenediamine was added in chloroform solution. A thick precipitate formed immediately with gas evolution. The mixture was warmed up at the reflux temperature and stirred for 1 hour. The solvent was distilled off and water added. After 5 minutes of boiling, the material was filtered hot. It consisted of 3.50 parts of poly-meta-xylylene diamine terephthalate.

Example V

The mixed anhydride from 2.92 parts of adipic acid was prepared according to Example I, but in chloroform solution. To this was added 3.28 parts durenediamine in 30 parts of chloroform at −10° C. and a white precipitate appeared soon. It was further stirred 2 hours at room temperature and 2 hours at the reflux temperature. Then it was cooled and filtered. Finally, it was boiled for 5 minutes with water, filtered hot and dried. 4.90 parts of poly-durene diamine adipate were obtained.

Example VI

The polymer obtained in Example II was heated for 30 minutes at a temperature of 250° C. under a stream of nitrogen, a polyhexamethylene adipamide with and inherent viscosity of 1.44 was obtained.

Example VII

A prepolymer of polytetramethylene adipamide was prepared in the conventional manner by reacting 146 parts of adipic acid with 88 parts of tetramethylene diamine to form the respective salt which was heated in a sealed vessel for 30 minutes at a temperature of 225° C. to yield a prepolymer with an inherent viscosity (measured as above) of 0.40.

Example VIII

The prepolymers of Examples III and VII were heated side-by-side in open tubes at atmospheric pressure under a nitrogen atmosphere and maintained at 280° C. while samples were periodically withdrawn for the determination of inherent viscosities (measured as above). The results are shown in the accompanying figure wherein the intrinsic viscosities (as ordinates) are plotted against time, in minutes (as abscissa), and wherein the solid curve represent the prepolymer of Example III and the dotted curve the prepolymer of Example VII.

It may be seen that although the initial inherent viscosity of the prepolymer prepared in accordance with Example III is somewhat lower than that of the prepolymer of Example VII, it rises to 1.14 in 10 minutes, producing an excellent fiber former. Its inherent viscosity rises to 1.75 in 30 minutes to 2.00 in 60 minutes and to 2.33 after two hours, producing a slightly colored product. The prepolymer of Example VII, on the other hand, attained an inherent viscosity only 1.38 after a heating period of 2 hours.

It is to be understood that the foregoing detailed description is given merely by way of illustration and that many variations may be made therein without departing from the spirit of my invention.

Having described my invention, what I desire to secure from Letters Patent is:

1. The method of preparing a linear polyamide which comprises reacting a mixed anhydride of the formula

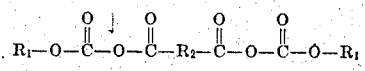

wherein $R_1$ is a monovalent hydrocarbon radical and $R_2$ is a divalent hydrocarbon radical free of ethylenic unsaturation with a primary diamine.

2. The method of preparing a linear polyamide which comprises reacting a mixed anhydride of the formula

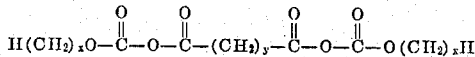

wherein $x$ is an integer from 1 to 5 and $y$ is an integer from 1 to 12 with a di-primary amine.

3. The method of claim 2 wherein said di-primary amine is hexamethylene diamine.

4. The method of claim 2 wherein said di-primary amine is tetramethylene diamine.

5. The method of preparing a low molecular weight linear polyamide which comprises reacting a mixed anhydride of the formula

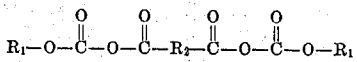

wherein $R_1$ is a monovalent hydrocarbon radical and $R_2$ is a divalent hydrocarbon radical free of ethylenic unsaturation with a primary diamine at a temperature beginning at an initial level between about −5° and −40° C. and ending at a level between about −15° and +25° C.

6. The method of preparing a high molecular weight linear polyamide which comprises reacting a mixed anhydride of the formula

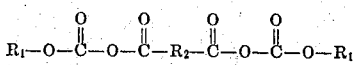

wherein $R_1$ is a monovalent hydrocarbon radical and $R_2$ is a divalent hydrocarbon radical free of ethylenic unsaturation with a primary diamine at a temperature beginning at an initial level between about −5° and −40° C. and ending at a level between about −15° and +25° C. and thereafter heating the product of said reaction to a temperature between about 50° and about 80° C. over a period between about 30 and about 120 minutes.

References Cited in the file of this patent

UNITED STATES PATENTS

| | | |
|---|---|---|
| 2,130,948 | Carothers | Sept. 20, 1938 |
| 2,163,584 | Carothers et al. | June 27, 1939 |
| 2,174,527 | Peterson | Oct. 3, 1939 |
| 2,277,125 | Martin | Mar. 24, 1942 |
| 2,384,118 | Muskat et al. | Sept. 4, 1945 |
| 2,615,914 | Rehberg | Oct. 28, 1952 |
| 2,708,617 | Magat et al. | May 17, 1955 |
| 2,713,045 | Wieland et al. | July 12, 1955 |
| 2,757,191 | Stilmar | July 31, 1956 |
| 2,840,602 | Larson | June 24, 1958 |

OTHER REFERENCES

Taylor: J. of American Chem. Soc., vol. 69, pp. 635–638, March 1947.